United States Patent [19]

Schultz et al.

[11] 4,376,190

[45] Mar. 8, 1983

[54] CATION COMPLEXES BETWEEN CATION GUESTS AND POLYMER HOSTS THAT CONTAIN CYCLIC ETHER UNITS

[75] Inventors: William J. Schultz; Margaret C. Etter; Alphonsus V. Pocius; Samuel Smith, all of St. Paul, Minn.

[73] Assignee: Minnesota Mining and Manufacturing Company, St. Paul, Minn.

[21] Appl. No.: 97,486

[22] Filed: Nov. 26, 1979

[51] Int. Cl.$^3$ .............................................. C08F 8/42
[52] U.S. Cl. ................................. 525/333.1; 525/332; 525/342; 525/368; 525/372; 528/417; 428/441; 428/462; 523/209; 523/205; 525/333.2; 525/326.1
[58] Field of Search .................... 260/42, 57; 525/334, 525/386, 387, 332, 368, 372, 373; 528/417; 428/441, 462

[56]  References Cited

U.S. PATENT DOCUMENTS 4,260,702  4/1981  Schultz et al. ...................... 525/334
4,309,516  1/1982  Schultz et al. ...................... 525/386

Primary Examiner—Paul R. Michl
Attorney, Agent, or Firm—Cruzan Alexander; Donald M. Sell; James V. Lilly

[57]  ABSTRACT

Complex compositions that comprise a cation guest and a polymer host are provided. The polymer host contains one or more cation-complexing segments that contain hetero atoms in a polydentate complexing array. At least two of the hetero atoms in the cation complexing segment comprise a cyclic ether selected from tetrahydrofuran 2,5-diyl units and tetrahydropyran 2,6-diyl units.

33 Claims, No Drawings

CATION COMPLEXES BETWEEN CATION GUESTS AND POLYMER HOSTS THAT CONTAIN CYCLIC ETHER UNITS

BACKGROUND OF THE INVENTION

The present invention relates to cation complexes. More particularly it relates to cation complexes that comprise a cation guest and a polydentate polymeric host that contains cyclic ether units joined together through either tetrahydrofuran 2,5- or tetrahydropyran 2,6-diyl linkages (or combinations thereof) to provide a specified array of multiple hetero atoms (described more fully hereinafter). The complexes of the invention result from ion-dipole interaction between the cation and the array of heteroatoms.

A variety of cation complexes have been reported in the literature. They comprise a cationic guest and a complexing host. The host typically contains a plurality of heteroatoms arranged in an array that makes them available for multi-dentate coordination with an appropriate cation.

Examples of known host compounds are poly(ethylene oxide), crown ethers (i.e., macrocyclic oligomers of ethylene oxide), cryptands (i.e., macrocyclic compounds that contain ether oxygen and amino nitrogen in a special array), and naturally occurring ionophores. The characteristics of these hosts and the manner in which they form complexes with cations have been reported. Thus, for example, see Poly(ethylene oxide), F. E. Bailey, Jr. and J. V. Koleske, pp. 94–102, Academic Press, 1976; C. J. Pedersen, J. Amer. Chem. Soc., 89, p. 7017 (1967); U.S. Pat. No. 3,562,295; C. J. Pedersen and H. K. Frensdorff, Angewandte Chemie, International Edition 11, p. 16 (1972); J. M. Lehn, "Structure and Bonding" 16, Chapter 1, Springer-Verlag (New York), 1973; J. M. Lehn, Accounts of Chem Research 11, pp 49–57 (1978); D. J. Cram and J. M. Cram, Accounts of Chem. Research 11, pp 8–14 (1978); J. J. Christensen, D. J. Eatough and R. M. Izatt, Chem. Revs. 74, p. 351 (1974); and U.S. Pat. No. 3,966,766.

Each of these hosts exhibit characteristics that limits it usefulness. For example, while poly(ethylene oxide) forms complexes with certain cations, the complexes are relatively unstable when compared with those formed between cations and either crown ethers or cryptands. This is due to the fact that, in solutions, poly(ethylene oxide) is capable of assuming numerous chain conformations, many of which are not effective in forming cation complexes.

Crown ethers and cryptands, on the other hand, can form stable complex compositions with certain cations. The cyclic structure of these compounds imposes relatively severe conformational constraints upon them thereby rendering them effective cation complexing agents for only certain cations. The conformations adopted during complexation are such as to provide cavities (i.e., holes in the molecule) bounded by electron-donor heteroatoms, thus providing a suitable chemical environment for ion-dipole coordination (i.e., complexing) with cations of suitable size. The cavities have fixed sizes that act as a strong determinant in controlling the stability of the complex formed between a given macrocycle and a given cation. Thus, the size of the cavity and the diameter of the cation must be relatively closely matched in order to provide stable complex compositions. These compounds are not, therefore, capable of forming stable complex compositions with a wide variety of cations of differing sizes.

The ionophores are typically either macrocyclic compounds per se (e.g., valinomycin) or compounds that have functional end groups that favor the formation of macrocycles via strong hydrogen bonding (e.g., monensin). Like the crown ethers and cryptands, the ionophores are selective toward the cations with which they will form stable complex compositions.

Structurally, some of the ionophores contain cyclic ether units which appear either as tetrahydrofuran 2,5-diyl or tetrahydropyran 2,6-diyl units. Prominent compounds of this type are monensin and nigericin. These compounds are not polymers and the cyclic ether units contained therein do not appear in segments that provide the array of complexing atoms specified by the present invention.

Additionally, monensin and nigericin are cation complexing agents only when they assume an anionic macrocyclic conformation. Thus, monensin, in the form in which one end group is present as an undissociated carboxylic acid (the other end being hydroxyl), exists in an acyclic conformation and is incapable of forming stable complexes with cations. In its carboxylate anion form, however, hydrogen-bonding between the anion and the distal hydroxyl group causes the molecule to assume the conformation of a macrocycle, the form in which it becomes an effective host for alkali metal cations. (See B. C. Pressman, Annual Revs. in Biochem. 45 pp. 504–507 (1976).)

In addition, certain synthetic compounds have been made that contain multiple tetrahydrofuran 2,5-diyl units. Thus, Y. Kobuke et al, J. Amer. Chem. Soc. 98 pp. 7414–7419 (1976) disclose a homologous series of macrocycles which contain tetrahydrofuran 2,5-diyl units. These compounds have low molecular weight and the tetrahydrofuran 2,5-diyl units are separated by aliphatic linking groups. This separation of the 2,5-diyl units causes a very large decrease in the cation complexing character of these materials.

D. J. Cram et al, Accounts of Chem. Res. 11, pp 8–14 (1978) disclose macrocycles containing multiple tetrahydrofuran 2,5-diyl units. In this case —$CH_2OCH_2$— units are interspersed between the tetrahydrofuran units. Consequently, these units do not provide the uninterrupted array of heteroatoms of the host polymers useful in this invention.

The polymeric hosts employed in the present invention form stable complexes with an extraordinarily large variety of cations. Moreover, a given polymeric host apparently can adjust its conformation to the coordination requirements of a given cationic guest. Consequently, the host is not specific with respect to the cations with which it will effectively interact. Thus, for example, complexes can be formed with organic cations (e.g., phenyldiazonium; trialkyl and triaryl sulfonium; alkyl ammonium, etc.) Complexes can also be formed with inorganic cations (e.g., ammonium, alkali metal, alkaline earth metal; zinc; thallium; silver; lead; mercury; tin; lanthanum; aluminum; and transition metal including iron, cobalt, molybdenum, chromium, nickel and tungsten.

SUMMARY OF THE INVENTION

In accordance with the present invention there is provided a complex that comprises a cation guest and a polymer host. The polymer host has a number average molecular weight of at least 1000 and contains one or more segments of the formula

 (I)

wherein said segments comprise at least about 5% by weight of said polymer and wherein
A is a cyclic ether unit selected from
(a) tetrahydrofuran 2,5-diyl units of the formula

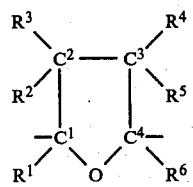

and
(b) tetrahydropyran 2,6-diyl units of the formulae

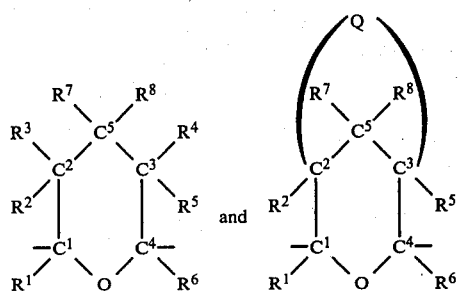

wherein $R^1$ through $R^6$ are individually selected from hydrogen and hydrocarbon groups;
$R^7$ and $R^8$ are individually selected from hyrogen, hydrocarbon groups and halo groups;
Q is a divalent linking moiety;
$B^1$ and $B^2$ are individually selected from A,

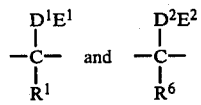

wherein
$D^1$ and $D^2$ are individually selected from oxygen and sulfur and
$E^1$ and $E^2$ are individually selected from hydrogen, lower alkyl groups, cycloalkyl groups and aryl groups.
n is an integer of at least two; and ⌇⌇⌇ represents the remainder of the polymer chain;
provided that at least one half of the $R^1$ through $R^8$ groups are hydrogen; and
provided that when there are four or more A groups joined consecutively together in said cation-complexing segment, at least about 30% of the junctures between adjacent A groups have a threo configuration.
In the above structure formulae, an arbitrary numbering system has been adopted for purposes of simplifying the generic description of the diyl-containing units. It should be recognized that conventional nomenclature would classify said units as tetrahydrofuran 2,5-diyl and tetrahydropyran 2,6-diyl corresponding respectively to the cyclic ether units containing 5 and 6 atoms in the ring respectively.
The cyclic ether units of the host polymers may be generally referred to herein as diyl units. The five-membered cyclic ether units may sometimes be referred to herein either as tetrahydrofuran 2,5-diyl units or 2,5-diyl units. (Alternatively they may be referred to as 2,5-oxolanylene units.) The six membered cyclic ether units may sometimes be referred to herein either as tetrahydropyran 2,6-diyl units or 2,6-diyl units.

Included as a preferred subclass of the polymer hosts useful in the present invention are those wherein the A and B units are each selected from the above described cyclic ether units. These host polymers provide cation-complexing segments that contain at least four A units joined consecutively together. Most preferably, this subclass of polymer hosts contains at least six A units joined consecutively together in the cation complexing segment with at least 50% of the junctures between the adjacent A units having a threo configuration.

When these combined factors of segment length and ring juncture configuration are met, complex formation with cations is manifested most readily. The foregoing subclass of polymer hosts may be represented by the formula

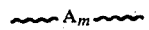 (II)

wherein m is at least four.
Included as another preferred subclass of useful polymer hosts are those wherein B is selected from

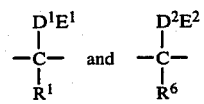

and wherein n is either two or three. Preferably $D^1$ and $D^2$ are oxygen.
This subclass of polymer hosts may be represented by the formula

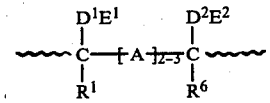 (III)

The host polymers utilized in this invention are at least tetradentate with respect to coordination with a cation. These cation-complexing segments are selected from specified classes of consecutively joined units all of which present an array of hetero atoms which is suitable for multidentate coordination with a cation. Preferably the heteroatoms are oxygen atoms. However, the Datoms may be sulfur atoms or oxygen atoms.

The complexes of the invention offer several surprising advantages. For example, cation-containing salts can be rendered soluble in organic solvents through formation of a complex of the cation contained in an aqueous solution and a polymeric host with subsequent extraction of the cation from the aqueous medium by an organic solvent that is immiscible with water.

The complexes of the invention can also be used to enhance the reactivity of cation-containing salts in nucleophilic substitution reactions. For example, the normal solvation sphere of the cation (often water) is at least partially replaced by ligands supplied by the polymeric host, thereby rendering the cation more organophilic and allowing greater dissociation of the anion in organic solvents, even those of low dielectric constant.

Another very important aspect of this invention stems from the treatment of solid surfaces which contain cation sites thereon with a thin layer of the polymeric host. The resulting modification of the solid surface by the strong bonding thereto of the polymeric host has the net effect of rendering the solid more organophilic. This may be attributed to the formation of cation-containing complexes in-situ on the solid surface. Thus, for example, finely divided zinc oxide that has been totally dispersed in an aqueous phase can be totally transferred to, and dispersed in, an organic phase that is immiscible with the water phase by simply adsorbing a polymeric host onto the zinc oxide particles.

Certain of the complexes of the invention also bring about the formation of stable suspensions and dispersions of particulate solids that contain cationic surface sites. Thus, inorganic powders (e.g., metal oxides) treated with a polymer host that has a number average molecular weight of at least about 5,000 may be readily dispersed in a variety of organic solvents. The resulting dispersions exhibit low settling rates and ready redispersibility. Untreated inorganic powders, on the other hand, tend to be difficult to disperse in organic solvents, the resulting dispersions exhibit very high settling rates, and they are difficult to redisperse.

To be useful in bringing about stable dispersions of these particulate solids in organic solvents, it is necessary that the host polymer complex with the particulates and separate the individual particles by more than about 100 angstroms, thereby preventing agglomeration of the particles. This is achieved by employing a sufficient concentration of a host polymer that has a number average molecular weight of at least about 5,000.

Additionally, the treatment of inorganic solids that contain cationic sites with thin layers of the polymeric host renders the resulting surfaces more receptive to treatment with organic materials. Thus, as the result of in situ complex formation the adhesion of subsequently applied thermoplastic and thermosetting resins to the thus treated inorganic surfaces is enhanced.

Thus, inorganic solids such as steel, copper, aluminum, brass, bronze, tin, etc. (all of which are characterized by containing a metal oxide surface layer) accept a thin layer coating of the polymer host which becomes tenaciously bonded to the solid. Silicate glass also accepts a thin layer coating of the polymer host. Here also the host becomes tenaciously bonded to the solid. As a result, various polymeric layers or laminates that are applied to the treated inorganic solid then demonstrate far superior adhesion properties than would otherwise be demonstrated in the absence of the intervening layer of the host polymer.

Polymers whose adhesion to inorganic solids treated with the polymer host is enhanced include polycarbonate, polyester, polyamide, polyurethane, polyacetal, and the various polymers and copolymers based on styrene, acrylonitrile, 1,3-diene, vinyl chloride, vinylidene chloride, vinyl acetate, methyl methacrylate, ethyl acrylate, acrylamide, vinyl alcohol, vinyl pyrrolidone, vinyl pyridene, acrylic and methacrylic acids, epoxide resin, phenolic resin, melamine resins, and urea resins.

The compositions of the present invention may be used in a diversity of areas that include coating metals for decorative or protective purposes; adhesively bonding or laminating films, sheets or plates of either organic or inorganic materials to metals or glass; forming stable dispersions of fine inorganic particles in organic liquids or solids; and utilizing inorganic particles or fibers in polymer matrices to produce composite materials.

DETAILED DESCRIPTION OF THE INVENTION

The host polymers useful in the present invention may consist essentially of segments of Formula I units. Alternatively, the host polymers may comprise copolymers of at least one segment of Formula I units and one or more other segments. Still further, the useful host polymers may comprise block or graft copolymers that contain at least one segment of Formula I units.

The A units within the cation-complexing segments may be either five- or six-membered cyclic ether units, or combinations of each. The six-membered cyclic ether units may also contain an an exocyclic ring (described herein as the divalent linking moiety Q). In any event, the nature of the cation-complexing segment is determined by the number of A units appearing therein. Thus, when four or more A units appear consecutively (e.g., as in Formula II) at least 30% of the junctures between adjacent A units have the threo configuration.

This means that the R groups attached to the $C^1$ and $C^4$ atoms (the ring juncture carbons) are fixed in a particular stereochemistry that may be illustrated by the following Newman projection along the ring juncture bond:

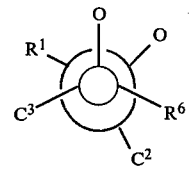

In this projection, the inner or smaller circle represents the $C^4$ atom of Formula I, while the outer or larger circle represents the $C^1$ atom of Formula I. As can be seen, in a threo ring juncture configuration, rotation about the ring juncture bond produces only those eclipsed arrangements for which fewer than two identical or similar groups are adjacent to one another. See "Basic Principles of Organic Chemistry", J. D. Roberts and M. C. Caserio, W. A. Benjamin, Inc. (1964) p. 580.

A polymer with all threo ring junctures may be graphically illustrated by

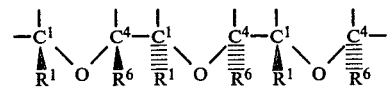

wherein the remainder of each cyclic ether unit has been omitted for purposes of simplicity. The bond represented by     means a bond projecting out of the plane of the paper, while the bond represented by     means a bond projecting into the plane of the paper. As can be seen, the same or similar substituents on adjacent ring juncture carbon atoms project in opposite directions when all of the oxygen atoms are aligned on the same side of the polymer chain.

An alternative configuration, i.e., the erythro configuration, the opposite of the threo configuration, may be represented by the following Newman projection:

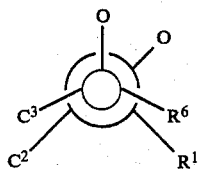

As can be seen from this projection, rotation about the ring juncture bond produces those eclipsed arrangements for which all identical or similar groups are adjacent to one another.

A polymer with all erythro ring junctures then is graphically illustrated by

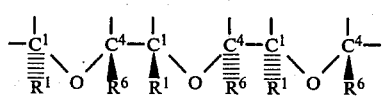

Thus in the erythro configuration, the same or similar substituents on adjacent ring juncture carbon atoms project in similar directions when all of the oxygen atoms are aligned on the same side of the polymer chain.

The importance of the threo configuration of the ring junctures to the complexing ability of the host polymer when 4 or more A units are joined together can be made more clear through the use of CPK space-filling molecular models (available from the Ealing Corporation, South Natick, Massachussetts). If one constructs a space-filling model containing four or more consecutively recurring A units, several features are discovered regarding the host polymer.

Steric factors allow the segments with the threo configuration to favor a conformation in which all of the oxygen atoms are aligned on one side of the chain. Similar steric factors prevent segments with the erythro configuration from favoring this same conformation. Longer segments that contain the threo ring juncture configuration also favor the assumption of a helical conformation in which the oxygen atoms point inward and the principal degrees of conformational freedom are variations in the diameter and pitch of the helix.

Although it is not completely understood why, it is believed that this structural feature accounts for the remarkable ability of even dilute solutions of the host polymers that contain segments of Formula II that have at least six consecutive A units to complex with cations of various sizes, shapes and ligand binding requirements. This remarkable ability is demonstrated hereinafter by phase transfer experiments. These experiments show that the host polymers complex with the cations in an aqueous phase and transfer them to a non-aqueous phase that is immiscible with the aqueous phase. In such instances, phase transfer occurs at a ratio of about ten diyl units per cation when the diyl units are present in segments that correspond to Formula II and the original cation concentration is about 0.0002 mole/liter.

When, on the other hand, the structural requirements of Formula II are not met, it has been found that the host polymer is much less efficient in forming complexes with cations in dilute solutions. It is believed that this is because the combined factors of appropriate segment length and ring juncture configuration must be met to enable the host polymer to provide a single cation-complexing segment that fully satisfies the coordination requirements of the cation under these conditions.

When only two or three A units are joined together, as in Formula III, the cation-complexing segment provides an array of either four or five heteroatoms available for coordination with cations. Each heteroatom is separated from the next closest heteroatom by two carbon atoms. Additionally either two or three of the heteroatoms in the segment are oxygen atoms that are provided by adjacent A units. Preferably, all of the heteroatoms in the segment are oxygen. The stereochemistry of the ring juncture between the adjacent A units is not critical. Thus, these junctures may have either threo or erythro configuration.

Polymers that contain cation-complexing segments of Formula III units can undergo complexing interaction with cations in dilute solutions although much less efficiently than polymers containing segments of Formula II units. Thus when the original cation concentration in water is about 0.02 mole/liter, it is necessary to employ the equivalent of about 100, or more, A+B units per cation in order to effect substantial phase transfer of the cation.

Cation-complexing segments that contain Formulae II and III units are also very useful in forming thin layers of cation-containing complexes on solid surfaces that contain positively charged (i.e., cationic) sites. Although the reason for this is not fully understood, it is believed that many of the coordination requirements of the positively charged site are already satisfied by nearest neighbor anions present within the lattice of the inorganic solid. Thus, a host polymer may need to only compete with solvent (often water) to satisfy the few remaining coordination sites available. In such circumstances, tetradentate host sements (i.e., those containing four heteroatoms in the specified array) are sufficient for furnishing suitable ligands for complexing with surface cations. Consequently, very strong interaction (i.e. tenacious bonding) results when the host polymer contains cation-complexing segments of Formulae II and III units.

One subclass of useful polymer hosts are those wherein the A units comprise tetrahydropyran 2,6-diyl units (either with or without the exocyclic Q group). At least 50% of the $R^1$ through $R^8$ groups are hydrogen. The remaining $R^1$ through $R^8$ groups are selected from hydrogen and hydrocarbon groups.

Examples of useful hydrocarbon groups include alkyl groups containing from 1 to about 4 carbon atoms, and aryl groups, especially phenyl. Most preferably the remaining $R^1$ through $R^8$ groups are hydrogen although the $R^7$ and $R^8$ groups may also be halo.

The Q group represents a divalent linking moiety that joins the $C^2$ and $C^3$ positions. Representative examples of useful Q groups include ethylene, carboxylic anhydride (i.e., $-\overset{O}{\overset{\|}{C}}-O-\overset{O}{\overset{\|}{C}}-$), dimethylene oxide, imide (i.e., $-\overset{O}{\overset{\|}{C}}-NH-\overset{O}{\overset{\|}{C}}-$), dimethylenesulfone, indenyl (i.e., ⌬), etc.

Most preferably the Q groups is an ethylene group (i.e., —CH$_2$—CH$_2$—).

Another subclass of useful polymer hosts is that wherein the A units comprise tetrahydrofuran 2,5-diyl units. At least 50% of the R$^1$ through R$^6$ groups are hydrogen. The remaining R$^1$ through R$^6$ groups are selected from hydrogen and hydrocarbon groups. Examples of useful hydrocarbon groups are set forth above. Most preferably the remaining R$^1$ through R$^6$ groups are hydrogen or the R$^1$ through R$^5$ groups are hydrogen and R$^6$ is methyl.

Host polymers useful in the present invention are further described in U.S. Pat. No. 4,309,516 (for those containing 2,5-diyl A units) and U.S. Pat. No. 4,260,702 filed contemporaneously herewith (for those containing 2,6-diyl A units). Details of the preparation of selected host polymers are contained in the above-referenced applications, both of which are incorporated by reference herein for said details.

In general these applications disclose the preparation and characterization of broad classes of polymers that contain segments of consecutively joined 2,5-diyl and 2,6-diyl units by a sequence of reactions. These reactions involve the epoxidation of precursor polymers that contain a specified array of main chain olefins and an ionically initiated ring expansion reaction.

Each of the diyl-containing host polymers is prepared from a precursor polymer which possesses certain structural features. Thus, in the case of the 2,5-diyl containing host polymer, the precursor contains one or more segments having the formula

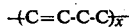

wherein x is at least three and is the number of times the unit appears in the segment and wherein each olefin group in the segment is separated from the next olefin group by two main chain carbon atoms.

In the case of the 2,6-diyl-containing host polymer, the precursor contains at least one segment having the formula

wherein y is at least three and wherein each olefin group in the segment is separated from the next olefin group by three carbons.

When the precursor polymer contains both butene and pentene segments in which the main chain olefin groups are separated by two or three carbon atoms, the subsequently prepared host polymers contain cation-complexing segments that comprise both 2,5-diyl and 2,6-diyl units.

Based upon the known organic reaction mechanisms involved herein, each epoxidized cis-olefin group in the precursor which undergoes the subsequent ring expansion reaction by initiation with a nucleophilic reagent such as KOH gives rise to a ring juncture between adjacent A units that has a threo configuration. On the other hand, each epoxidized trans-olefin group in the precursor which undergoes subsequent ring expansion under similar circumstances gives rise to a ring juncture between adjacent A units that has an erythro configuration. Thus, for example, in order to achieve a host wherein at least 30% of the junctures between adjacent A units have the threo configuration, it is necessary that the precursor contain olefin units whose configurations are at least 30% cis. Polymers containing both threo and erythro configurations result when the precursor contains a mixture of cis-and trans-olefin units. The ratio of threo to erythro ring juncture configurations in the polymer is directly proportional to the ratio of cis-olefin to trans-olefin units in the precursor.

The manner in which the configuration of the precursor polymer controls the final ring juncture configuration of the polymeric hosts useful in the present invention is further discussed and explained in K. Masuzaki et al, J. Polymer Science, Polymer Chem. Ed. 15, pp. 647–658 (1977).

The complexes of the invention may be readily prepared by contacting a cation guest with a polymer host of the type described above and allowing the cation-complexing segment of the host to chelate (i.e., complex with) the cation. Contact may be achieved in solution or by applying the polymer host to a solid whose surface contains cationic sites.

Surprisingly it has been found that when the surface comprises silicate glass, and when the host polymer is modified by reaction with a silane coupling agent, and when the modified host polymer is then applied to the glass surface, the adhesion of polymeric materials such as are described above is even more greatly enhanced. Preferably the silane coupling agents, which are known materials, have the formula

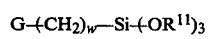

wherein G is a group capable of reacting with said polymer host, w is selected from 0, 1, 2 or 3 and R$^{11}$ is a lower alkyl group. Representative examples of useful G groups include —NH$_2$, CH$_2$=CH—, and O=C=N—.

Preferably the amount of silane coupling agent reacted with the host polymer comprises from about 0.5 to 5 parts by weight per 100 parts by weight of said host polymer.

The structure of the polymers that contain the tetrahydrofuran 2,5-diyl units and the tetrahydropyran 2,6-diyl units can be demonstrated by proton nuclear magnetic resonance (nmr). For example, the analyses of polytetrahydrofuran 2,5-diyl and polytetrahydropyran 2,6-diyl polymers prepared from cis-olefin precursors were run in deuterochloroform as the solvent and all chemical shifts (i.e., absorption peaks) were reported in parts per million (ppm) from tetramethyl silane. The peak assignments were as follows:

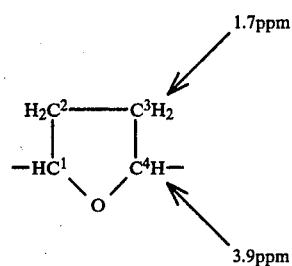

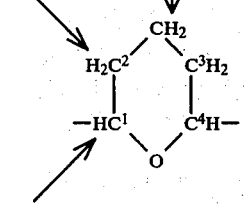

-continued
1.5–1.6ppm 3.4, 3.8, 3.9ppm

The methine hydrogen atoms of the tetrahydropyran 2,6-diyl units show multiple absorptions because of the different stereochemical configurations present.

Carbon-13 nmr is also useful in determining the structure of the diyl units. Moreover, it allows better distinction between certain functional groups than does proton nmr. Thus, the analysis of polytetrahydrofuran 2,5-diyl was run in o-dichlorobenzene as the solvent and the carbon chemical shifts were as follows:

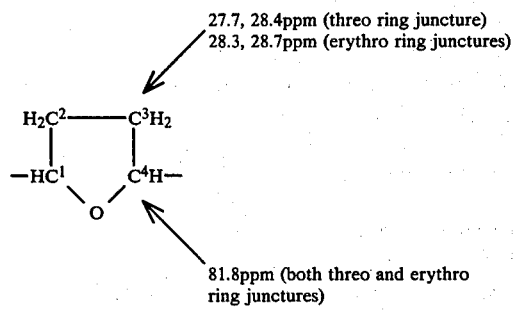

Additionally, the following peak assignments were made for the following functional B units from the carbon-13 nmr

| OH<br>\|<br>—CH— | $CH_3O—$ |
|---|---|
| 73.4ppm | 58.6ppm |

The present invention is further illustrated by the following examples. Several polymer hosts were utilized in these examples. The hosts were prepared according to the techniques described below.

Polymer A

One hundred grams of a polybutadiene (100,000 number average molecular weight, 98 mole percent cis-1,4-butadiene units and 2 mole percent 1,2-vinyl units) was dissolved in 1900 grams of methylene chloride. The solution was then reacted with 380 grams of a peracetic acid solution that had been buffered with 8 grams of sodium acetate. (The peracetic acid solution comprised 40% peracetic acid, 40% acetic acid, 13% water, 5% hydrogen peroxide and 2% sulfuric acid and was available from FMC Corporation.) The acid solution was added slowly to the solution of polybutadiene and methylene chloride over a forty minute period. The temperature of the reaction mixture was maintained below 30° C. After adding all of the peracetic acid, the reaction was continued for about 6 hours at a temperature of about 25° C. The resulting epoxidized polymer was precipitated in methyl alcohol, redissolved in p-dioxane and reprecipitated in distilled water. The polymer was examined by proton nmr and it was determined that all main chain olefin groups had been epoxidized while the pendent vinyl groups remained unreacted.

A 6% by weight solution of the polymer was prepared in 90/10 mixture of dioxane/methanol. Ten mole percent of tetramethylammonium methoxide, based upon the olefin content of the original polybutadiene, was added to the solution and the resulting mixture was heated to 80° C. and reacted for 24 hours to form a 2,5-diyl containing polymer. The polymer was precipitated in distilled water and dried over $P_2O_5$ at about 1 Torr for 24 hours.

Proton nmr analysis indicated that the polymer comprised about 77 mole percent tetrahydrofuran-2,5-diyl units, about 5 mole % of pendent methoxy and hydroxy units, about 2 mole % pendant vinyl units, and about 16 mole % of residual oxirane units. The great majority (i.e., more than 50%) of the 2,5-diyl units were joined one to the other in segments containing at least six of said diyl units. Substantially all of the ring junctures between adjacent diyl units had threo ring juncture configuration.

The final dry product was a colorless, tough, leathery material that swelled and softened considerably when contacted with water.

Polymer B–E

Epoxidized cis-1,4-polybutadiene was prepared as described above for Polymer A. A solution of 30 grams of the epoxidized polybutadiene in 730 grams of dioxane was warmed to 75° C., and 111 grams of a 10% by weight solution of tetrabutylammonium hydroxide in methanol was added. The mixture was reacted in an inert atmosphere at 75° C. Individual samples were removed from the reaction mixture after 30 minutes (Polymer B), 60 minutes (Polymer C), 120 minutes (Polymer D) and 180 minutes (Polymer E). These samples were precipitated into one liter of water and soaked for 16 hours. The samples were then dried in a dessicator over $P_2O_5$ at 1 Torr for 72 hours. The tetrahydrofuran-2,5-diyl unit content of the resulting polymer was determined by proton nmr and was as follows:

| Polymer B | 23% |
|---|---|
| Polymer C | 47% |
| Polymer D | 58% |
| Polymer E | 66% |

The great majority of the 2,5-diyl units were joined one to the other in segments that contained at least six of said diyl units. The remainder of the polymer chain largely comprised recurring oxirane units. Substantially all of the ring junctures between adjacent 2,5-diyl units had the threo ring juncture configuration.

Polymers F–G

Epoxidized cis-1,4-polybutadiene (number average molecular weight of 100,000) was prepared as described for Polymer A except that a less than stoichiometric amount of peracetic acid was used in each case. Thus, 76 mole % and 68 mole % of peracetic acid was used to prepare the epoxidized precursors of Polymers F and G respectively.

These mole percentages were based on the main chain olefin concentration of the polybutadiene. Proton nmr showed that the degrees of epoxidation corresponded to the concentrations of peracetic acid used, e.g., 76% and 68% epoxidation of olefin groups. After purification, separate solutions comprising 10 grams of each of the epoxidized polybutadienes, 190 grams of dioxane and 20 grams of methanol were prepared and warmed to 75° C. A 25% solution of tetrabutylammonium hydroxide in methanol (14.7 g) was added to each of these solutions, and the ring expansion reactions were allowed to proceed for 84 hours. The soft elastomeric products were purified by the procedure used in the preparation of Polymer A. Analytical results obtained by proton nmr are tabulated below.

| Polymer | Polymer Composition (mole %) | | | | |
|---|---|---|---|---|---|
| | $CH_2=CH-$ [a] | $-CH=CH-$ [b] | $-CH-CH-$ (epoxide) | (THF ring) | Combined[c] $-CHOH$ and $-CHOCH_3$ |
| F | 2 | 22 | 26 | 36 | 30 |
| G | 2 | 29 | 36 | 22 | 24 |

[a] Pendent vinyl groups
[b] Main chain olefin groups
[c] Functional groups resulting from the initiation and termination steps of the ring expansion reaction.
(Since each precursor main chain olefin group is theoretically capable of yielding 2 of these functional groups, the molar percentages reported above total more than 100%.)

Based on their modes of preparation and the analytical information, it can be deduced that these polymers are characterized by a high content of segments comprising units of the type

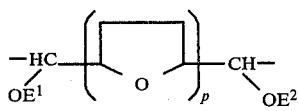

in which $E^1$ and $E^2$ are individually either hydrogen or methyl and p is 2 or 3 in the case of Polymer F and 1 or 2 in the case of Polymer G.

Polymer H

Trans-1,4-polybutadiene of approximately 100,000 number average molecular weight ("Trans-4" available from Phillips Petroleum Company) was converted to a tetrahydrofuran-2,5-diyl containing polymer by the following procedure. Two solutions were prepared:

| Solution A | |
|---|---|
| trans-1,4-polybutadiene | 50 grams |
| methylene chloride | 1000 ml |
| Solution B | |
| peracetic acid solution | 176 grams |
| sodium acetate (buffering agent) | 12 grams |

Solution B was slowly added to Solution A from a dropping funnel over a 40 minute period while the temperature of the mixture was maintained below 30° C. The mixture was then reacted for an additional 3½ hours while the temperature was maintained at less than 25° C. The resulting epoxidized polymer was precipitated in methyl alcohol, redissolved in p-dioxane and reprecipitated in distilled water.

Thirty grams of the recovered epoxidized polymer were dissolved in 730 g of dioxane and reacted with 14 g of a 25% by weight solution of tetrabutylammonium hydroxide in methanol for 16 hours at 75° C. in an inert atmosphere. The 2,5-diyl polymer was recovered by precipitating the reaction solution into 3 liters of deionized water. The polymer was then dried at 1 Torr over $P_2O_5$ for 48 hours and found to be a tough, leathery material. The polymer was shown by nmr to comprise 65% tetrahydrofuran 2,5-diyl units. These units were largely arrayed in segments greater than 6 units in length. Substantially all of the ring junctures between adjacent diyl units were in the erythro-ring juncture configuration rather than the threo ring juncture configuration.

Polymer I

A tetrahydrofuran 2,5-diyl containing polymer was prepared from cis-1,4-polyisoprene from the following two solutions:

| Solution A | |
|---|---|
| cis-1,4-polyisoprene (number average molecular weight approximately 100,000) | 100 grams |
| dichloromethane | 2000 ml |
| Solution B | |
| peracetic acid solution | 353 grams |
| sodium acetate (buffering agent) | 24 grams |

Solution B was slowly added to Solution A from a dropping funnel over a two-hour period, the temperature of the mixture being maintained below 5° C. The mixture was then reacted for an additional 30 minutes while maintaining a temperature less than 5° C. The resulting epoxidized polymer was precipitated in methyl alcohol and washed four times with copious quantities of methyl alcohol. The polymer was 98 percent epoxidized.

The following ingredients were charged to a reaction vessel in a nitrogen atmosphere:

| epoxidized polyisoprene (from above) | 2 grams |
|---|---|
| dioxane | 40 grams |
| cyclohexanol | 8 grams |
| potassium-t-butoxide | 0.25 grams |

The reaction mixture was maintained under nitrogen for 16 hours at 100° C. with agitation. The resultant 2-methyl tetrahydrofuran-2,5-diyl containing polymer was then precipitated and washed with water. The polymer was a hard, glassy material that softened at about 60° C. and comprised about 75 mole percent 2,5-diyl units (as determined by proton nmr). The large majority of the 2,5-diyl units were present in segments of at least six consecutive diyl units. Substantially all of these units were joined to one another in the threo ring juncture configuration.

Polymer J

Cis-polycyclopentene was prepared by following the procedure described in Die Angewandte Makromolekulare Chemie, 16/17, p 51-74 (1971). The polymer was epoxidized using the following two solutions:

| Solution A | |
|---|---|
| cis-polycyclopentene (number average molecular weight approximately 120,000) | 21 grams |
| chloroform | 850 grams |
| Solution B | |
| peracetic acid solution* | 65 grams |
| sodium acetate (buffering agent) | 24 grams |

*40% peracetic acid, 40% acetic acid, 13% water, 5% hydrogen peroxide and 2% sulfuric acid.

Solution A was placed in a 3 neck flask, and was cooled to 5° C. with an ice bath. Solution B was placed in a dropping funnel on the flask and was added to Solution A with stirring over a 30 minute period. The reaction mixture was cooled intermittently so as to maintain the reaction temperature between 20° C. and 25° C. After addition of solution B, the reaction was allowed to proceed at 25° C. for 2¼ hours.

The resultant epoxidized polycyclopentene (EPCP) was purified by first adding 1 liter of water and stirring vigorously for 30 minutes. The water was decanted and replaced by 1 liter of a 2% sodium carbonate solution in water which was stirred for 16 hours after which the solution was decanted.

The polymer was recovered by precipitation into methyl alcohol. The yield was 25.4 g. Proton nmr showed the product to consist essentially of fully epoxidized polycyclopentene.

A 2.8% by weight solution was prepared by dissolving 25 g of EPCP in 722 g of purified dioxane (e.g., dioxane freshly distilled from calcium hydride). Secondary butyl alcohol (250 g) was slowly added to the solution with gentle agitation. (The secondary butyl alcohol precipitated the polymer if added too rapidly.) The solution of EPCP was then checked by vapor phase chromatography to ensure that no trace amounts of chloroform remained.

The EPCP was ring expanded by reacting 17.5 g of EPCP solution (0.5 g dry EPCP) with 2 ml of a 0.6 N solution of potassium tert-butoxide in tert-butanol. Reaction was carried out at about 87° C. for 24 hours in a sealed vial under a nitrogen atmosphere. Upon completion of the reaction, the polymer was purified by first precipitating it into 100 ml distilled water and then washing it with an additional 500 ml of distilled water. The tough, leathery segmented polymeric product was shown by proton nmr in deutrochloroform to contain 78 mole % tetrahydropyran-2,6-diyl units (connected in a threo ring juncture configuration) and 22 mole % oxirane units, i.e.,

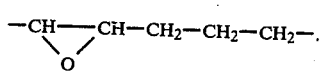

The majority of the 2,6-diyl units were present in segments containing at least six of said units joined one to the other.

Polymer K

A tetrahydropyran-2,6-diyl polymer was prepared from polynorbornene (PNB) having the structure

The olefin linkage in the PNB was 94% cis and 6% trans. The PNB was prepared by the procedure described in Ivin, Laverty, and Rooney, Makromol Chem. Vol. 178, p. 1545-60, 1977.

The PNB was epoxidized using the following solutions:

| Solution A | |
|---|---|
| PNB | 30 grams |
| chloroform | 970 grams |
| Solution B | |
| Peracetic acid solution (as described above) | 66 grams |
| Sodium acetate | 2.0 gram |

Solution A was placed in a 2 liter flask. Solution B was slowly added over a 40 minute period while cooling the flask to maintain the temperature below 25° C. The solution was purified by precipitation into 2 liters of methanol, redissolved in 1 liter of dioxane and reprecipitated into 2 liters of water. The polymer was then dried in a dessicator at 1 Torr over P₂O₅. Thirty-four grams of epoxidized polynorbornene was recovered. The structure of the polymer was

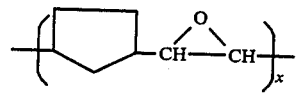

The epoxidized polynorbornene (EPNB) was ring-expanded by dissolving 5.3 grams of EPNB in 196 grams of cyclohexanol. Sixteen ml of a 0.6 N solution of potassium tert-butoxide was added to the EPNB solution. The solution was reacted 16 hours at 135° C. The reaction product was purified by precipitation into 2 liters of a 75/25 by weight mixture of methanol and water. The resulting polymer, a hard, glassy material, contained 70% 2,6-diyl units, as shown by proton nmr. The basic cyclic ether unit had the structure

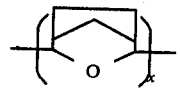

The ratio of threo/erythro-ring junctures in the segments was 94/6. The large majority of the diyl units resided in segments containing at least 6 consecutively joined 2,6-diyl units.

Polymer L

A polybutadiene containing 80% cis-, 19% trans- and 1% vinyl olefin groups and having a number average molecular weight of 3,000 (Polyol Hüls 130 from Chemische Werke Hüls Aktiengesellschaft) was epoxidized utilizing the following solutions:

Solution A
50 grams polybutadiene
450 grams CH₂Cl₂
Solution B 190 grams of peracetic acid solution (as described above)

8 grams of sodium acetate

Solution A was placed in a 1 liter flask and cooled with an ice bath. Solution B was added via a dropping funnel over a 40 minute period. The temperature was maintained below 25° C. The solution was then allowed to react for 2½ hours at 25° C. The solution was then purified by multiple washings with a 2% sodium carbonate solution.

The resulting epoxidized polybutadiene was vacuum dried and dissolved in a solvent mixture of 200 grams of dioxane and 200 grams of sec-butanol. 11.2 grams of potassium tert-butoxide was added to the above solution and it was reacted for 16 hours at 80° C. The product was precipitated in 2 liters of water and washed with an additional two liters of water. The final polymer, a viscous liquid, contained 75% tetrahydrofuran-2,5-diyl units and the ring juncture configuration of adjacent units was approximately 80% threo and 20% erythro. The majority of these units were present in segments consisting of at least 6 consecutively joined 2,5-diyl units.

Polymer M

A polybutadiene having 9 mole percent vinyl units, 38 mole percent cis-1,4-butadiene units, and 53 mole percent trans-1,4-butadiene units was obtained by an anionic polymerization of butadiene with butyl lithium in cyclohexane. The number average molecular weight was 11,000. This polymer was epoxidized and ring expanded using the procedure described in the preparation of polymer A. The resulting polymer, a brittle, glassy material, had 54 mole percent tetrahydrofuran-2,5-diyl units present and the majority of these units resided in segments containing 4 or more such units in consecutive array. The configuration of ring junctures in these segments was approximately 42% threo and 58% erythro.

Polymer N

A graft polymer was prepared using the following recipe

| Polymer A | 3 grams |
| dodecylmethacrylate | 3 grams |
| toluene | 18 grams |
| t-butyl hydroperoxide | 0.03 grams |

The solution was placed in a sealed vessel in an oxygen-free atmosphere and reacted for forty hours at 70° C. The resulting clear, rubbery graft polymer was analyzed by proton nmr which showed it to be 46 weight percent polymerized dodecylmethacrylate and 54 weight percent Polymer A. The graft polymer swelled greatly in both methanol and n-heptane.

Polymer O

Polycyclopentene was prepared that contained 80% trans and 20% cis olefin units. The recipe for this preparation was as follows:

Solution A

A 0.05 mole solution in toluene with respect to both tungsten and anhydrous ethanol.

Solution B

A 0.2 molar solution of $C_2H_5AlCl_2$ in heptane.

Toluene (160 g) and cyclopentene previously purified by distillation from NaH (40 g) were placed in a dried glass bottle fitted with a rubbery septum. Solution A and B (2.5 ml each) were charged into the bottle with a syringe through the rubber septum. The bottle was then gently agitated on a shaker for 4 hours at 25° C. The resulting polymer was recovered by precipitation into methanol. Twenty-two grams of polymer was recovered.

This polymer was dissolved in methylene chloride and epoxidized with peracetic acid by the procedure used in the preparation of polymer A.

The fully epoxidized polycyclopentene was then ring expanded by the following procedure. Five grams of the fully epoxidized polycyclopentene was dissolved in 200 grams of dioxane and 40 grams of tertiary butanol. 30 ml of a 1.0 molar solution of potassium tert butoxide was added to the epoxidized polycyclopentene solution. The solution was heated, in a 3 neck, stirred flask to 80° C. for 120 hours. The product was recovered by precipitation into two liters of distilled water. Proton nmr analysis of the product indicated that it contained 75%, 2,6-diyl and 25% oxirane units containing at least six of said units joined together and having a ring juncture configuration ration of 4:1 erythro:threo.

EXAMPLE 1

This example demonstrates the effect that the structural features of host polymers containing 2,5- and 2,6-diyl units have upon their complexing ability. The complexing ability of the host polymers was demonstrated by their ability to solubilize salts in an organic solvent via cation complexation.

Standard solutions of various diyl-containing polymers were prepared by dissolving 0.25 gram of the polymer in one liter of chloroform. Twenty ml of each solution was placed in a container along with one gram of potassium picrate and agitated for 16 hours. The samples were then allowed to stand for 48 hours. The ultraviolet absorbances of the various solutions following standing was then measured at 353 nanometers (nm). Higher absorbance values indicated that more of the potassium had been complexed thereby solubilizing the salt. The absorbence values of the solutions and the polymers used are listed in Table 1.

TABLE 1

| AGENT | Diyl Content (mole %) | Ring Juncture % Threo | Ring Juncture % Erythro | ABSORBENCE |
|---|---|---|---|---|
| None | 0 | — | — | 0.000 |
| Polymer A | 77 | 100 | — | 2.390 |
| Polymer B | 23 | 100 | — | 0.971 |
| Polymer C | 47 | 100 | — | 1.668 |
| Polymer D | 58 | 100 | — | 2.078 |
| Polymer E | 66 | 100 | — | 2.160 |
| Polymer F | 36 | 100 | — | 0.450 |
| Polymer G | 22 | 100 | — | 0.273 |
| Polymer H | 65 | — | 100 | 0.000 |
| Polymer O | 75 | 20 | 80 | 0.000 |

These data demonstrate that Polymers A, B, C, D and E are remarkably effective solubilizing agents for potassium picrate in chloroform. The solubilizing activity of these particular polymers is seen to be proportional to the weight content of tetrahydrofuran 2,5-diyl units which are consecutively arrayed in long segments (e.g., 6 or more diyl units) in which the ring juncture configuration is predominantly threo. Polymers F and G, which are characterized by high contents of segments of the type

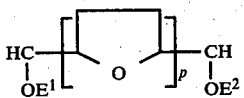

where p is either 2 or 3 and $E^1$ and $E^2$ are individually either hydrogen or a methyl group, are seen to have lesser solubilizing activity. Polymers H and O, each characterized by a high erythro-ring juncture configuration of their long, consecutively arrayed diyl units, are seen to possess no salt solubilizing activity.

EXAMPLE 2

This example demonstrates the importance of the structural features of the host polymers upon the ability of the host polymers to serve as complexing agents. The complexing ability is demonstrated by showing the ability of dilute solutions of the polymeric hosts to transfer potassium picrate from a dilute water solution thereof into chloroform.

A solution of potassium picrate was prepared by dissolving 0.025 g of the salt in one liter of deionized water. Separate ten ml portions of the salt solution were mixed with separate 20 ml portions of the various polymer solutions being tested. The polymer solutions comprised 0.25 g in one liter of chloroform. The mixtures were agitated for 16 hours then allowed to stand for 48 hours. The concentration of the salt in the aqueous phase was measured both before and after addition of the polymer solutions. The ultraviolet absorption of the aqueous phase at 353 nm was used for this determination. The difference in the two values measured the amount of salt transferred into the chloroform phase. The results of this test are set forth in Table 2.

TABLE 2

| Host | Absorbance of Aqueous Phase Initial | Absorbance of Aqueous Phase Final | % Salt Extracted |
|---|---|---|---|
| Polyethylene oxide (mol. wt. = 100,000) | 1.119 | 1.119 | 0 |
| Dibenzo-18-crown-6 | 1.119 | 0.995 | 11 |
| Polymer A | 1.119 | 0.530 | 53 |
| Polymer B | 1.119 | 0.971 | 17 |
| Polymer D | 1.119 | 0.782 | 30 |
| Polymer F | 1.119 | 1.119 | 0 |
| Polymer G | 1.119 | 1.119 | 0 |
| Polymer H | 1.119 | 1.119 | 0 |
| Polymer I | 1.119 | 0.939 | 16 |
| Polymer J | 1.119 | 0.470 | 58 |
| Polymer K | 1.119 | 1.019 | 9 |
| Polymer L | 1.119 | 0.436 | 61 |
| Polymer O | 1.119 | 1.119 | 0 |

Polymers A, B, D, F, G, H, I and L contain tetrahydrofuran 2,5-diyl units, while Polymers, J, K, and O contain tetrahydrofuran 2,6-diyl units.

This experiment constitutes a sensitive test for the ability of a given polymer to serve as a host for a cation guest. Under the conditions utilized herein, Polymers A, B, D, I, J, K and L functioned as effective phase transfer agents as a result of possessing the requisite degrees of appropriate ring juncture configuration and appropriately sized array of consecutively joined diyl units.

Polymers A, B and D are seen to possess phase transfer activity toward potassium picrate in direct proportion to the weight content of tetrahydrofuran 2,5-diyl units in the cation-complexing segments. Polymers F and G do not function as phase transfer agents in this test because the polydentate character of their host segments is simply too low to provide a satisfactorily stable ligand to potassium ion when both polymeric host and cation guest are present in such dilute concentrations. Polymers H and O show no activity because the essentially exclusive erythro ring juncture configuration of the diyl units in their segments precludes the segments from assuming a conformation that is effective in providing a suitable host site for the cation guest.

EXAMPLE 3

Polymer A was employed to complex a variety of cations and thereby allow their salts to be extracted from an aqueous medium into chloroform. A master solution that comprised 0.25 g Polymer A and one liter chloroform was prepared. Separate solutions of different picrate salts were prepared that comprised 0.025 g salt in one liter deionized water. Ten milliliters (ml) of each of the salt solutions were mixed with 20 ml of the solution of Polymer A. The mixtures were agitated for 16 hours and then allowed to stand for 48 hours in order to achieve phase separation. The concentration of the picrate salt in the aqueous phase was measured as described in Example 2 both before and after the addition of the solution of Polymer A. The results of this test are set forth in Table 3.

TABLE 3

| SALT | SALT SOLUTION INITIAL ABSORBENCE | SALT SOLUTION INITIAL ABSORBENCE | % SALT EXTRACTED |
|---|---|---|---|
| Li picrate | 1.272 | 0.801 | 37% |
| Na picrate | 1.219 | 0.630 | 48% |
| K picrate | 1.119 | 0.530 | 53% |
| Mg picrate | 1.115 | 0.679 | 42% |
| Ba picrate | 1.023 | 0.344 | 67% |

When this example was repeated using 100,000 molecular weight ("Polyox WSRN-10" from Union Carbide Company) as the complexing agent and potassium picrate as the salt, the polyethylene oxide did not transfer any potassium from the water phase to the chloroform phase.

EXAMPLE 4

This example demonstrates that a variety of metal ions can be complexed with host polymers of the type described in this invention. The metal salts employed were

| | | |
|---|---|---|
| $Co(ClO_4)_2$ | $Al(SO_3CF_3)_3$ | $Ni(SO_3CF_3)_2$ |
| $Cr(ClO_4)_3$ | $Zn(SO_3CF_3)_2$ | $La(SO_3CF_3)_3$ |
| $AgClO_4$ | $Pb(SO_3CF_3)_2$ | $Fe(NO_3)_2$ |
| $AgSO_3CF_3$ | $Sn(SO_3CF_3)_4$ | |

Each of the metal salts (0.001 mole) was dissolved in one ml of tetrahydrofuran. A separate solution comprising 0.002 mole, based on the A units in polymer A in 1.2 ml tetrahydrofuran, was added. A precipitate formed in each case which had the characteristic color of the metal ion complexed (e.g., pink for $Co^{+2}$, green for $Ni^{+2}$, etc.). The precipitates were recovered and dissolved in $CH_2Cl_2$. The formation of the precipitate in the tetrahydrofuran solution and the solubility of the precipitate in $CH_2Cl_2$ are indicative of complex formation between Polymer A and the metal salts. When the metal salts were added to CH₂Cl₂ alone, they did not dissolve.

EXAMPLE 5

This example illustrates that salts may be solubilized in appropriate host polymers as a result of cation complexation, thereby affecting the thermal properties of the polymeric host.

Various salts were dissolved in a 10% solution of Polymer A in a mixed solvent of 90 parts tetrahydrofuran/10 parts methanol. Films of these mixtures were cast on poly(tetrafluoroethylene) plates by allowing the solutions to air dry overnight and then heating the peeled films for several hours at 100° C. All films were clear. X-ray diffraction analyses indicated complete solubilization of all of the salts tested, since no crystal pattern could be observed. The glass transition temperatures were determined by differential thermal analysis and the results are given in Table 4.

TABLE 4

| Polymer | Salt | | Glass Transition Temp. |
|---|---|---|---|
| Polymer A | no salt | | 9° C. |
| Polymer A 10 parts | K picrate | 1 part | 20° C. |
| Polymer A 10 parts | Mg picrate | 1 part | 22° C. |
| Polymer A 10 parts | Mg picrate | 4 parts | 38° C. |
| Polymer A 10 parts | CoCl₂ | 1 part | 21° C. |
| Polymer A 10 parts | Co(ClO₄)₂ | 1 part | 41° C. |

EXAMPLE 6

This example illustrates that a complex of the invention may be solubilized within a conventional polymer, thereby altering its properties.

A 10% by weight solution of La(CF₃SO₃)₃ in tetrahydrofuran was prepared. To 5 ml of this solution was added 10 ml of an 11% solution of Polymer A in tetrahydrofuran. The lanthanum complex precipitated. A 10% solution of poly(vinyl chloride) in tetrahydrofuran (70 ml) was added in small increments, with agitation. The lanthanum complex was completely soluble in the mixture at this point. A crystal clear film was cast from this solution. Small angle light scattering experiments showed the film to be homogeneous. Similar experiments were performed to incorporate Co (II) and Cr (III) in poly(vinyl chloride) by the formation of complexes of Polymer A with Co(ClO₄)₂ and CrCl₃.

The electrical properties of the film containing 10% cobalt salt were examined. It was found to have a lower volume resistivity (2.6×10¹³ ohms Ω-cm) and a considerably higher dielectric constant (15.8 at 100 Hz) at 25° C. than does conventional poly(vinyl chloride).

It was found that in the absence of Polymer A, none of these salts could be solubilized in poly(vinyl chloride).

EXAMPLE 7

This example demonstrates the complexing of organic cations by appropriate diyl-containing polymers.

The following solutions were prepared:

(A) 1.4 g of Polymer A in 50 ml. of CHCl₃

(B) 1.4 g of 18-Crown-6 (commercially available from Aldrich Chemical Company) in 50 ml. of CHCl₃

(C) 0.02 g of methylene blue in 1000 ml. of H₂O

The chemical formula of methylene blue is:

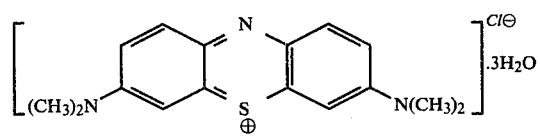

A five-ml portion of solution C (the methylene blue solution) was suspended over each of the following:

| Sample | Amount |
|---|---|
| D | 5 ml. of solution A |
| E | 5 ml. of solution B |
| F | 5 ml. of CHCl₃ (Control) |

These samples were then shaken for one hour. The samples were then centrifuged and the absorption spectrum of the aqueous phase of each sample was measured. The following were the results:

| Sample | Absorbance |
|---|---|
| D | 0.042 |
| E | 0.249 |
| F | 0.253 |

These data indicate that little or no methylene blue is transferred in the presence of 18-Crown-6, but a very substantial portion is transferred in the presence of Polymer A, indicating that this host polymer is very effective in the formation of a molecular complex with the large methylene blue cation, while the 18-Crown-6 is not.

EXAMPLE 8

This example demonstrates that polymeric hosts which contain segments of Formula I form complexes with heavy metal compounds and that these complexes are more useful in catalyzing the reaction between diols and polyisocyanates than are the conventional heavy metal catalysts normally employed (typically compounds of tin, lead or mercury).

Two separate reaction mixtures were prepared. The first comprised 20 grams of "C.P.C. 0200" (a polycaprolactone diol having an equivalent weight of about 540 commercially available from Union Carbide) with 10 grams of "Mondur MRS" (a polyfunctional isocyanate commercially available from Mobay Chemical Company) and 0.1 gram dibutyltin dioleate. The second composition was identical to the first composition except that 0.4 g of Polymer A was also added.

The diol, polyisocyanate and Polymer A, if present, were premixed together at room temperature. The dibutyltin dioleate was then added and the time required for the sample to become tack free was measured.

The polymers were then allowed to cure for 48 hours at room temperature and were then post cured for 30 minutes at 80° C. The hardness of the polymers was then measured to determine the extent of cure. The results obtained are set forth in Table 5.

TABLE 5

| FORMULA | DIYL POLYMERIC HOST USED | TACK FREE TIME | SHORE A HARDNESS |
|---|---|---|---|
| A | No | 120 min. | 51 |

TABLE 5-continued

| FORMULA | DIYL POLYMERIC HOST USED | TACK FREE TIME | SHORE A HARDNESS |
|---------|---------------------------|----------------|------------------|
| B | Yes | 4 min. | 67 |

The above data demonstrate that the polyurethane prepared in the presence of the complex cured more quickly and completely.

The cured polyurethanes were then evaluated for their hydrolytic stability. They were placed in a 100% relative humidity chamber at 80° C. for 48 hours. Sample A degraded to a liquid. Sample B was still a strong film having a Shore A hardness of 42 at the end of the test.

EXAMPLE 9

This example demonstrates that the polymeric hosts defined in this invention adsorb strongly onto the surfaces of inorganic particulates from organic solvents.

A sample of Polymer A, which contains approximately 2 mole % of hydroxyl groups, was radioactively tagged by acetylation with carbon-14 enriched acetic anhydride. (The radioactivity was used as a probe of the amount of Polymer A present in solution.) A set of solutions was made up, each containing 0.097 g of carbon-14-tagged Polymer A in 20 ml of toluene. One of these solutions was retained as a standard. Five grams of an inorganic particulate of known surface area was added to each of the remaining solutions. The dispersions were shaken overnight. The particulates were removed from each suspension by centrifugation and an aliquot of each resulting supernatant solution was removed. The aliquot was then measured for radioactivity by standard scintillation techniques and compared to the standard. The amount of radioactivity remaining in the solution was directly proportional to the amount of Polymer A present in solution. Consequently, a determination could be made as to how much Polymer A was adsorbed on the particulate. Table 6 shows the data obtained from this experiment.

TABLE 6

| PARTICULATE | AMOUNT OF POLYMER A ADSORBED PER UNIT SURFACE AREA OF PARTICULATE (grams/m$^2$) |
|---|---|
| Zinc oxide | $4.1 \times 10^{-3}$ |
| Aluminum hydroxide | $5 \times 10^{-3}$ |
| Cupric oxide | $8.6 \times 10^{-3}$ |
| Tungsten oxide | $2 \times 10^{-3}$ |

An aliquot of the supernatant solution from an independent adsorption experiment involving zinc oxide was analyzed by atomic adsorption spectroscopy. This was found to contain dissolved zinc at a concentration of 21 micrograms/ml.

A similar set of experiments were run in which 5 g quantities of inorganic particulates were shaken 24 hours in separate solutions containing 0.0072 g of radioactively tagged Polymer A dissolved in tetrahydrofuran. Again the particulates were removed by centrifugation and the fractions of the polymer adsorbed onto the particles were calculated following the measurement of residual polymer remaining in solution by scintillation counting.

The well drained particulates containing the adsorbed, radioactive polymer were dried in vacuum at 25° C. for 24 hours, then resuspended in 20 ml of neat tetrahydrofuran and shaken overnight. These dispersions were again centrifuged and the fraction of polymer that had been desorbed was determined.

These data are reported in Table 7.

TABLE 7

| Particulate | % of Polymer A Adsorbed from Solution | % of Polymer A Retained by Particulate Following Desorption by Tetrahydrofuran |
|---|---|---|
| CaCo$_3$ | 71 | 95 |
| MgO | 99 | 99 |
| ZnO | 90 | 96 |
| BaO | 68 | 99 |
| Al(OH)$_3$ | 88 | 98 |
| Talc | 99 | 99 |

These data show that a polymeric host, as defined in this invention, is strongly adsorbed onto surfaces of metal oxides, hydrated metal oxides and metal salts. Moreover, the adsorbed polymeric host is tenaciously retained by such surfaces, as shown by its resistance to desorption. This behavior can be attributed to the formation of stable complexes between metal cation sites on the particulate surface and the polymeric host.

EXAMPLE 10

This example sets forth the manner in which the structural features of polymers containing either tetrahydrofuran-2,5-diyl units or tetrahydropyran-2,6-diyl units affect their ability to adsorb onto cationic sites of inorganic particulates and thereby confer stability to their dispersions in organic media.

Three dispersions of strontium chromate in methyl ethyl ketone were prepared by the following recipe:

| Sample | A | B | C |
|---|---|---|---|
| Strontium Chromate | 2 g | 2 g | 2 g |
| Methyl ethyl ketone | 100 g | 100 g | 100 g |
| Polymer A | 0.04 g | — | — |
| Polymer J | — | 0.04 g | — |

The dispersions were prepared by ball milling the ingredients for 24 hours. The time required for substantially all of the pigment to settle out of solution was then observed. Samples A and B required approximately 24 hours to settle from solution. Sample C (the control) was completely settled in three minutes.

Another measure of the quality of the dispersions was the particle size distribution thereof. This was measured for Samples A and C by means of a Cahn electrobalance. The average dispersed particle size in sample A was 2 microns. The average dispersed particle size in Sample C (the control) was 13 microns.

EXAMPLE 11

The efficacies of several of Polymers A through O were tested with regard to their ability to furnish stable dispersions of zinc oxide in toluene. These experiments entailed the mixing of 3 g of zinc oxide powder (Photox 80 ® from New Jersey Zinc Company), 27 g toluene and 0.09 g of test polymer. After ball milling these mixtures for 16 hours, aliquots of each were poured into 5 ml graduate cylinders. These samples were examined after 7 minutes and then again after 6 hours of standing to determine the degree of settling of the zinc oxide. Where settling was incomplete, the volume of clear supernatant liquid that appeared after 6 hours was recorded. The data are given in Table 8.

TABLE 8

| Polymer Sample | Volume of Clear Supernatant after 6 hours (ml) |
|---|---|
| Control | Completely settled in 7 minutes |
| A | 0.4 |
| F* | 0.3 |
| H | Completely settled in 7 minutes |
| I | 0.3 |
| J | 0.2 |
| K | 0.2 |
| L | Completely settled in 7 minutes |
| M | 0.7 |
| N | 0.2 |

*An 80:20 toluene:chloroform solution was used as the dispersing medium, since Polymer F is not fully soluble in toluene.

Thus it is seen that, with the exception of Polymer L, polymers containing significant concentration of segments comprising either units of the

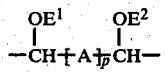

in which p was either 2 or 3, or $[A]_q$ in which q was at least 4 and at least 30% of the ring junctures made threo configuration are effective dispersing agents for inorganic particulates in organic media.

It was previously shown (Example 3) that Polymer L forms molecular cation complexes in solution and therefore might be expected to function as an effective dispersing agent for inorganic particulates. The fact that it does not do so is attributable to its low molecular weight, approximately 3800. It has been found that even though a low molecular weight polymeric host may be an effective complexing agent, it must have a molecular weight of at least 5,000 to function effectively as a dispersing agent. It is believed that the reason for this is that the adsorbed polymer must have a sufficiently long chain length so as to assure an average separation of individual cation-containing particles of about 100 angstroms. Unless this degree of separation is achieved, the particles tend to agglomerate due to the intrinsic attractive forces that they exert on one another.

An additional experiment was run in which a mixture of 3 g zinc oxide, 27 g n-heptane and 0.17 g Polymer N were ball milled and examined as previously described. In this case the ball milled control sample settled completely in 5 minutes, while the sample containing Polymer N formed only 0.2 ml of clear supernatant after standing for 6 hours. This experiment thus demonstrates how graft polymerization can be employed to modify the properties of appropriate polymeric hosts.

EXAMPLE 12

This example demonstrates that a thin intervening layer of an appropriate polymeric host markedly improves the adhesion between conventional polymers and metals.

Panels of cold rolled steel (15×15×0.3 cm.) were degreased with methyl ethyl ketone, lightly abraded with 600 grit sandpaper and then rinsed with methyl ethyl ketone. A priming layer of about 1.5 micrometer dry thickness was applied to each panel by bar coating a 5–6% solution of the indicated polymeric host.

The adhesion of a thermoplastic polyurethane (Estane ® 5703 from B. F. Goodrich Company) to the thus primed steel was evaluated in the following fashion. A film strip (10×2.5×0.3 cm) of the polyurethane was placed on the dry primed surface of the panel and a 35×3.75 cm. strip of cotton duck canvas (235 g/m² weight) was overlaid on it. A bond was formed between the polyurethane and the panel and between the polyurethane and the cotton duck by pressing the composite structure at 150° C. at 8.8 kg/cm² for 15 seconds. The adhesion between the polyurethane and the steel was then determined by using an Instron tensile tester at a peel angle of 180°. The results are given in Table 9.

TABLE 9

| Priming Layers | Coating Solvent | Peel Force (kg/cm width) |
|---|---|---|
| none | — | 1.2 |
| Polymer A | Toluene | 3.3 |
| Polymer F | Toluene | 5.1 |
| Polymer G | Toluene | 2.6 |
| Polymer J | Toluene | 3.4 |
| Polymer K | 90/10 Dioxane/methanol | 3.8 |
| Polymer L | Toluene | 3.6 |
| Polymer M | Toluene | 5.2 |

Almost identical results were obtained using aluminum panels instead of steel in the same tests.

Comparable results were obtained using a star block polymer of styrene and butadiene (Solprene ® 414P from Phillips Petroleum Company) instead of the polyurethane in these tests.

EXAMPLE 13

This example illustrates the benefits which result from the use of an appropriate polymeric host to improve the adhesion of various polymers to glass.

Glass plates (10×10×0.6 cm) were rinsed with methyl ethyl ketone, dried and bar coated to deposit 0.02 mm (wet thickness) of the following primer solutions.

| Primer No. | Solution |
|---|---|
| 1 | 6% solution of Polymer A in toluene |
| 2 | 6% Polymer A and 0.3% $(C_2H_5O)_3Si-(CH_2)_3NCO$ in toluene (Silane Y-9030 from Union Carbide Corp.) dissolved in toluene |
| 3 | 0.3% solution of Silane Y-9030 in toluene |
| 4 | None |

The coated plates were air dried for 30 minutes and then dried for 10 minutes in a 50° C. forced air oven.

The adhesion of a thermoplastic polyurethane (Estane ® 5703 from B. F. Goodrich Chemical Company) to the primed glass panels was evaluated. A 10×2.5×0.3 cm film of Estane ® was placed on each panel. A 35×3.75 cm strip of 10 ounce cotton duck canvas was placed on top of the Estane ®. A bond was formed between the panel and the Estane ® and between the Estane ® and the cotton duck by pressing the panels at 150° C. at 8.8 kg/cm² for 15 seconds. The peel strength of the bond between the Estane ® and the glass surface was then determined at an 180° angle using an Instron tensile tester. The results are given below.

| Primer No. | Peel Force (kg/cm width) |
|---|---|
| 1 | 1.3 |
| 2 | 3.9 |
| 3 | 0.7 |
| 4 (none) | 0.7 |

A separate, identical composite sample which utilized Primer #2 was then allowed to soak in water at room temperature for 2 weeks. No noticeable deterioration of the adhesion of the polyurethane to glass was detected.

In another experiment glass plates were treated in identical fashion with Primer solutions #2 and 3.

Ten grams of polycarbonate molding resin (Lexan ® 9770 from General Electric Company) was placed on each of the primed plates, as well as on an unprimed, clean glass plate. Clear laminates were then produced by pressing these materials at a pressure 5 kg/cm² and a temperature of 220° C. The polycarbonate sheet showed poor adhesion (less than 0.5 kg/cm peel force) to both the unprimed glass and the glass primed with Primer No. 3. The polycarbonate sheet adhered tenaciously to the Primer No. 2 glass.

In an additional experiment, films were cast onto clean glass surfaces from 10% tetrahydrofuran solutions of poly(vinyl chloride) in one case, and a mixture of 75:25 poly(vinyl chloride): Polymer A in another case. The films were air dried for 16 hours and then at 80° C. for 30 minutes. Good adhesion to the glass of the clear film containing Polymer A was observed, while the film containing only poly(vinyl chloride) did not adhere and actually showed spontaneous curl up from the glass surface during the heating cycle.

Thus, it is seen that the use of host polymers improve the adhesion of various thermoplastic polymers to glass. Moreover, it is seen that the use of a reactive silane coupling agent in conjunction with a suitable polymeric host confers a synergistic effect with regard to the adhesion of such thermoplastics to glass. Such priming treatments are valuable in the preparation of glass fiber reinforced polymer composites, as well as in the preparation of coated or laminated glass articles.

EXAMPLE 14

This example describes how a suitable polymeric host may be advantageously used to provide filled polymeric composites having improved mechanical properties.

Clay-filled polyurethane elastomers were prepared using three different procedures. In one case a control sample was prepared in which no host polymer was utilized (sample 1 in the table below). In a second case the untreated clay was dispersed in the polyol reactant and the polymer A was then added (sample 2 in the table below).

Finally, the clay was pretreated by slurrying 100 g of kaolin in 1500 g of toluene which contained dissolved therein 0.75 g of Polymer A. This clay slurry containing adsorbed Polymer A was poured into shallow pans, allowed to air dry and then was heated at 50° C. in a forced air oven. This pretreated clay was then dispersed in the polyol reactant (sample 3 in the table below).

The following formulations were prepared by mixing the ingredients in proportions shown below.

| Ingredients | Sample Number | | |
|---|---|---|---|
| | 1 | 2 | 3 |
| Polyester polyol, Desmophen 1652 (Mobay Chem. Co.) | 58 g. | 58 g. | 58 g. |
| Butyl benzyl phthalate | 62 g. | 62 g. | 62 g. |
| Kaolin clay, untreated | 61 g. | 61 g. | — |
| Kaolin treated with Polymer A | — | — | 61 g |
| Polymer A | — | 0.45 g. | — |
| N,N—dimethyl benzylamine | 0.61 g. | 0.61 g. | 0.61 g. |

These mixtures were ball milled for 48 hours after which 5.9 g of Mondur MRS (a polyisocyanate from Mobay Chemical Company) was added, with stirring, into 100 g samples of each of the above formulations. These resins were cast into 0.5 mm films which were allowed to cure at room temperature for 72 hours. The stress-strain properties of these soft polyurethane elastomers were then determined using an Instron tester.

| Sample | Tensile Strength (kg/cm²) | Elongation (%) |
|---|---|---|
| 1 | 17.2 | 150 |
| 2 | 23.1 | 150 |
| 3 | 31.5 | 150 |

Thus it is seen that the inclusion of a suitable polymeric host increases the toughness of mineral-filled polymeric composites.

What is claimed is:

1. A complex that comprises a cation guest and a polymer host wherein said polymer host has a number average molecular weight of at least 1000 and contains one or more cation-complexing segments of the formula

wherein said segments comprise at least 5% by weight of said polymer and wherein A is a cyclic ether selected from (a) tetrahydrofuran 2,5-diyl units of the formula

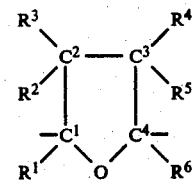

and (b) tetrahydropyran 2,6-diyl units of the formulae

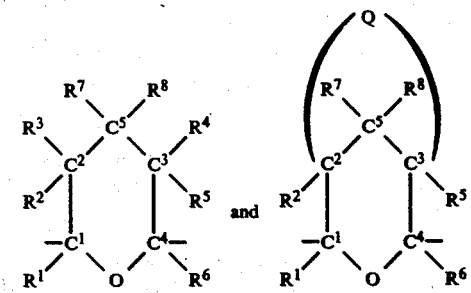

wherein $R^1$ through $R^6$ are individually selected from hydrogen and hydrocarbon groups; $R^7$ and $R^8$ are individually selected from hydrogen, hydrocarbon groups and halo groups; Q is a divalent linking moiety; $B^1$ and $B^2$ are individually selected from A,

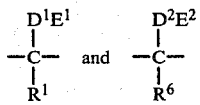

wherein $D^1$ and $D^2$ are individually selected from oxygen and sulfur and $E^1$ and $E^2$ are individually selected from hydrogen, lower alkyl groups, cycloalkyl groups and aryl groups;

n is an integer of at least 2; and

〰️ represents the remainder of the polymer chain;

provided that at least one half of the $R^1$ through $R^8$ groups are hydrogen; and provided that when there are four or more A groups joined consecutively together in said cation-complexing segment, at least about 30% of the junctures between adjacent A groups have a threo configuration.

2. A complex according to claim 1 wherein $B^1$ and $B^2$ individually have the formulae

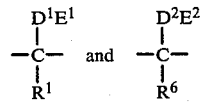

and wherein n is an integer selected from 2 and 3.

3. A complex according to claim 2 wherein $B^1$ and $B^2$ individually have the formulae

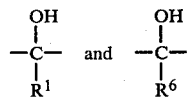

wherein $R^1$ and $R^6$ are individually selected from hydrogen and lower alkyl groups.

4. A complex according to claim 3 wherein A is said tetrahydrofuran 2,5-diyl unit.

5. A complex according to claim 3 wherein A is selected from said tetrahydropyran 2,6-diyl units.

6. A complex according to claim 1 wherein B is selected from tetrahydropyran 2,6-diyl and tetrahydrofuran 2,5-diyl units, n is an integer of at least 4, and at least 50% of the junctures between adjacent A groups have the threo configuration.

7. A complex according to claim 6 wherein said polymer host consists essentially of said cation-complexing segment.

8. A complex according to claim 6 wherein said A units are tetrahydrofuran 2,5-diyl units.

9. A complex according to claim 8 wherein each R group in said tetrahydrofuran 2,5-diyl units is hydrogen.

10. A complex according to claim 8 wherein the $R^1$ through $R^5$ groups in said tetrahydrofuran 2,5-diyl units are hydrogen and the $R^6$ group in said tetrahydrofuran 2,5-diyl units is methyl.

11. A complex according to claim 6 wherein said A units are selected from said tetrahydropyran 2,6-diyl units.

12. A complex according to claim 11 wherein said tetrahydropyran 2,6-diyl units have the formula

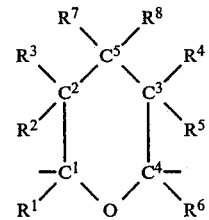

13. A complex according to claim 12 wherein each R group is hydrogen.

14. A complex according to claim 11 wherein said tetrahydropyran 2,6-diyl units have the formula

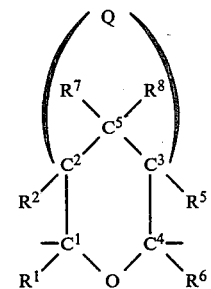

15. A complex according to claim 14 wherein each R group is hydrogen and Q is ethylene.

16. A complex according to claim 1 wherein said cation guest is provided by the surface of an inorganic solid.

17. A complex according to claim 6 wherein said cation guest is provided by the surface of an inorganic solid.

18. A complex according to claim 16 wherein said inorganic solid comprises a particulate material that has cationic surface sites.

19. A liquid non-aqueous dispersion of the complex according to claim 18 wherein the polymer host has a number average molecular weight of at least 5,000.

20. A complex according to claim 19 wherein said particulate material is zinc oxide.

21. A complex according to claim 16 wherein said cation guest comprises an inorganic fiber.

22. A complex according to claim 16 wherein said inorganic solid comprises a metal sheet having an oxide surface layer thereon.

23. A complex according to claim 1 wherein said cation guest is provided by the surface of an organic material.

24. A composite comprising a first phase of a polymer matrix and a second phase selected from inorganic fillers and inorganic fibers each having cationic sites on their surfaces, said second phase having bonded thereto a polymer host having a number average molecular weight of at least 1000 and containing one or more cation-complexing segments of the formula

wherein said segments comprise at least 5% by weight of said polymer host and wherein A is a cyclic ether selected from (a) tetrahydrofuran 2,5-diyl units of the formula

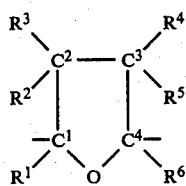

and (b) tetrahydropyran 2,6-diyl units of the formulae

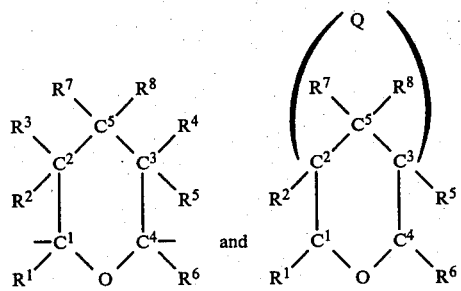

wherein $R^1$ through $R^6$ are individually selected from hydrogen and hydrocarbon groups; $R^7$ and $R^8$ are individually selected from hydrogen, hydrocarbon groups and halo groups; Q is a divalent linking moiety; $B^1$ and $B^2$ are individually selected from A,

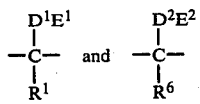

wherein $D^1$ and $D^2$ are individually selected from oxygen and sulfur and $E^1$ and $E^2$ are individually selected from hydrogen, lower alkyl groups, cycloalkyl groups and aryl groups;

n is an integer of at least 2; and

∼∼∼represents the remainder of the polymer chain;

provided that at least one half of the $R^1$ through $R^8$ groups are hydrogen; and provided that when there are four or more A groups joined consecutively together in said cation-complexing segment, at least about 30% of the junctures between adjacent A groups have a threo configuration.

25. A composite according to claim 24 wherein said polymer host comprises a thin layer that intervenes between said first phase and said second phase.

26. A composite according to claim 25 wherein said second phase comprises said inorganic filler particles.

27. A composite according to claim 25 wherein said second phase comprises a silicate glass fiber.

28. A composite according to claim 27 wherein said thin layer between said silicate glass fiber and said first phase comprises the reaction product of said polymer host and a silane of the formula $G{+}CH_2{\overline{)_w}}Si{+}OR^{11})_3$ wherein G is a group capable of reacting with said polymer host, w is selected from 0, 1, 2 or 3 and $R^{11}$ is a lower alkyl group.

29. An article comprising a continuous sheet that has cationic surface sites, a thin layer of a polymer host bonded to said continuous sheet, and a layer of a polymer on said layer of polymer host said polymer host having a number average molecular weight of at least 1000 and containing one or more cation-complexing segments of the formula

wherein said segments comprise at least 5% by weight of said polymer host and wherein A is a cyclic ether selected from (a) tetrahydrofuran 2,5-diyl units of the formula

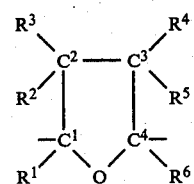

and (b) tetrahydropyran 2,6-diyl units of the formulae

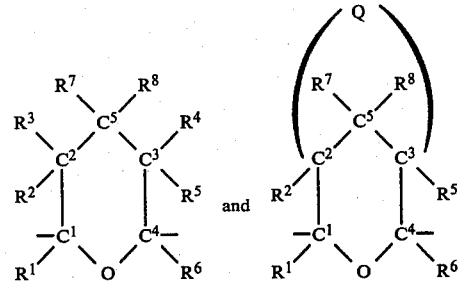

wherein
$R^1$ through $R^6$ are individually selected from hydrogen and hydrocarbon groups;
$R^7$ and $R^8$ are individually selected from hydrogen, hydrocarbon groups and halo groups;
Q is a divalent linking moiety;
$B^1$ and $B^2$ are individually selected from A,

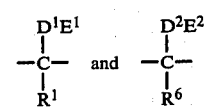

wherein
$D^1$ and $D^2$ are individually selected from oxygen and sulfur and $E^1$ and $E^2$ are individually selected from hydrogen, lower alkyl groups, cycloalkyl groups and aryl groups;
n is an integer of at least 2; and ∼∼∼represents the remainder of the polymer chain;

provided that at least one half of the $R^1$ through $R^8$ groups are hydrogen; and provided that when there are four or more A groups joined consecutively together in said cation-complexing segment, at least about 30% of the junctures between adjacent A groups have a threo configuration.

30. An article according to claim 29 wherein said continuous sheet comprises a metal.

31. An article according to claim 29 wherein said continuous sheet comprises silicate glass.

32. An article according to claim 31 wherein said thin layer between said silicate glass and said polymer comprises the reaction product of said polymer host and a silane of the formula

wherein G is a group capable of reacting with said polymer host, w is selected from 0, 1, 2 or 3 and $R^{11}$ is a lower alkyl group.

33. A method of forming a complex between a cation guest and a polymer host that comprises the steps of (a) providing a cation guest;

(b) contacting said guest with a polymer host having a number average molecular weight of at least 1000 and containing one or more cation-complexing segments of the formula

wherein said segments comprise at least 5% by weight of said polymer host and wherein A is a cyclic ether selected from (a) tetrahydrofuran 2,5-diyl units of the formula

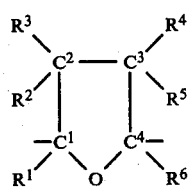

and (b) tetrahydropyran 2,6-diyl units of the formulae

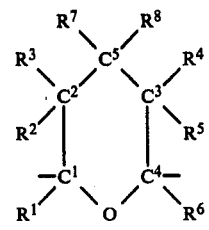

and

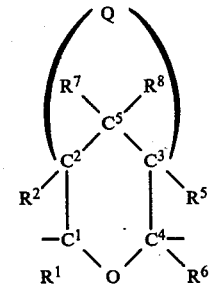

wherein
$R^1$ through $R^6$ are individually selected from hydrogen and hydrocarbon groups;
$R^7$ and $R^8$ are individually selected from hydrogen, hydrocarbon groups and halo groups;
Q is a divalent linking moiety;
$B^1$ and $B^2$ are individually selected from A,

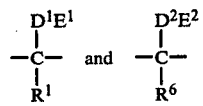

wherein
$D^1$ and $D^2$ are individually selected from oxygen and sulfur and $E^1$ and $E^2$ are individually selected from hydrogen, lower alkyl groups, cycloalkyl groups and aryl groups;
n is an integer of at least 2; and
~~~ represents the remainder of the polymer chain;
provided that at least one half of the $R^1$ through $R^8$ groups are hydrogen; and
provided that when there are four or more A groups joined consecutively together in said cation-complexing segment, at least about 30% of the junctures between adjacent A groups having a threo configuration; and (c) forming the complex between said guest and said host.

* * * * *

UNITED STATES PATENT AND TRADEMARK OFFICE
CERTIFICATE OF CORRECTION

PATENT NO. : 4,376,190
DATED : March 8, 1983
INVENTOR(S) : William J. Schultz, Margaret C. Etter,
Alphonsus V. Pocius and Samuel Smith It is certified that error appears in the above—identified patent and that said Letters Patent is hereby corrected as shown below:

Col. 3, line 51, in the blank space please insert --$\bigwedge\!\bigwedge\!\bigwedge\!\bigwedge$--.

Col. 3, line 59, "structure" should read --structural--.

Col. 6, line 59, in the blank space please insert -- ▲ --.

Col. 6, line 60, in the blank space please insert --≜--.

Col. 9, line 1, "groups" should read --group--.

Col. 11, line 7, "$CH_2$" should read --$C^5H_2$--.

Col. 12, line 29, "Polymer" should read --Polymers--.

Col. 16, line 4, first structure, "CH=CH" should read --$CH=CH_2$--.

Col. 20, line 31, "Initial", second occurrence, should read --Final--.

Col. 23, line 54, "adsorption" should read --absorption--.

Signed and Sealed this

Sixth Day of September 1983

[SEAL]

Attest:

GERALD J. MOSSINGHOFF

*Attesting Officer*  *Commissioner of Patents and Trademarks*